(No Model.)
T. R. McKNIGHT.
ROAD SCRAPER.
No. 518,268. Patented Apr. 17, 1894.
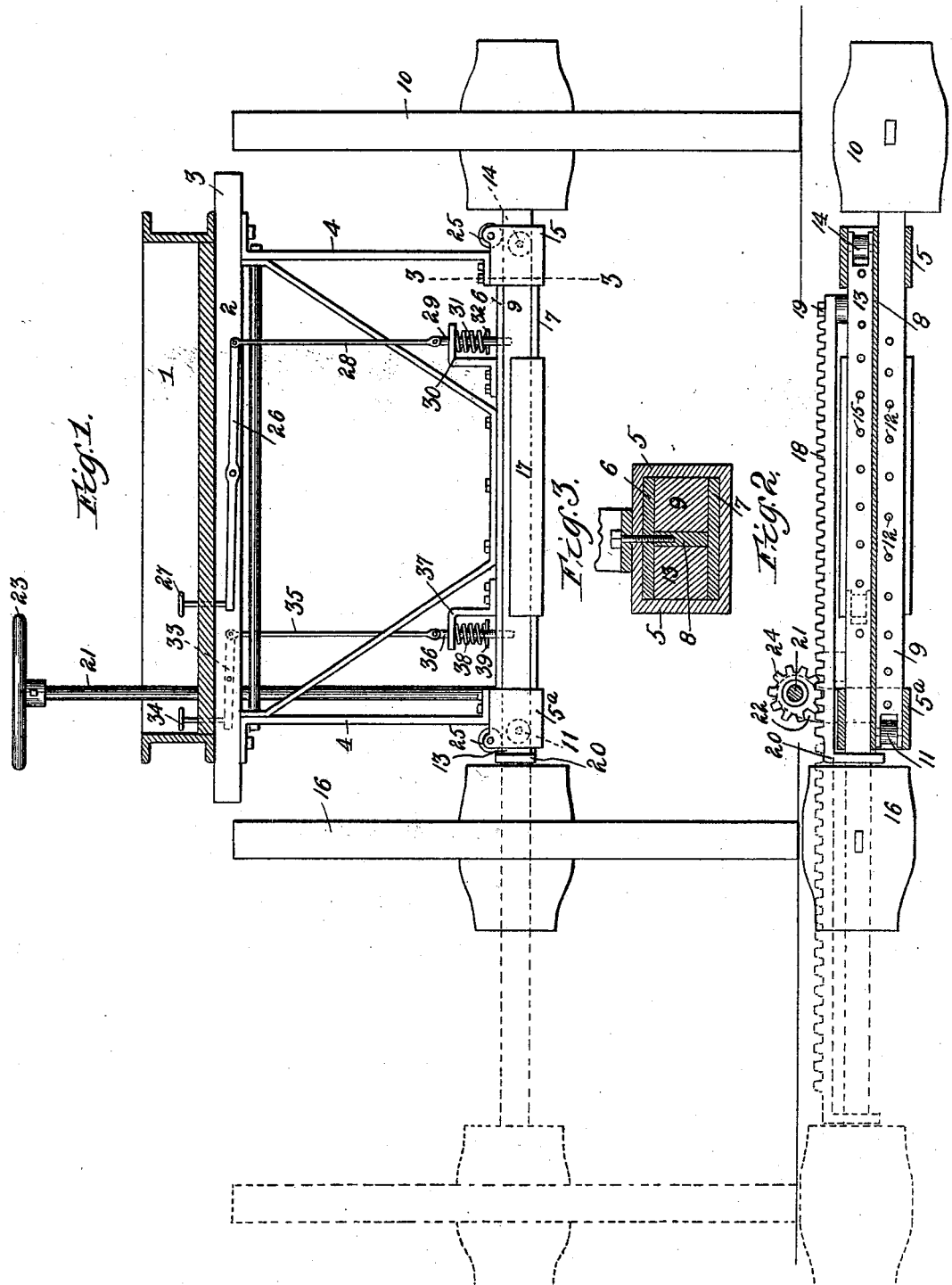
Witnesses,
Wm. M. Rheem.
Julia M. Bristol
Inventor
Thomas R. McKnight
by Bond, Adams, Pickard & Jackson
Atty/s.

UNITED STATES PATENT OFFICE.

THOMAS R. McKNIGHT, OF AURORA, ILLINOIS, ASSIGNOR TO THE WESTERN WHEELED SCRAPER COMPANY, OF ILLINOIS.

ROAD-SCRAPER.

SPECIFICATION forming part of Letters Patent No. 518,268, dated April 17, 1894.

Application filed March 28, 1893. Serial No. 468,065. (No model.)

*To all whom it may concern:*

Be it known that I, THOMAS R. McKNIGHT, a citizen of the United States, residing at Aurora, Kane county, Illinois, have invented certain new and useful Improvements in Road-Scrapers, of which the following is a specification, reference being had to the accompanying drawings, in which—

Figure 1 is a rear view of the rear portion of the road scraper, partially in cross section. Fig. 2 is a detail, being a top or plan view of the axles of the rear wheels of the scraper, with the upper portion of the framework removed. Fig. 3 is an enlarged detail, being a cross section of the axle box on line 3—3 of Fig. 1.

My invention relates to improvements in road scrapers, and its objects are to provide mechanism by which the rear wheels of the scraper may be spread apart from one another so as to adjust them to different widths, to fix them in the desired position, and to enable the frame of the scraper to be adjusted on different parts of the axle when the wheels are so spread apart. I accomplish these objects as hereinafter specified and as illustrated in the drawings. That which I regard as new will be set forth in the claims.

In the drawings,—1 indicates the frame of the scraper.

2 indicates a supporting frame, which is provided with a cross bar 3 and uprights 4.

5—5ª indicate boxes, which are secured to the lower ends of the uprights 4.

6 indicates a top plate, which is mounted in the boxes 5—5ª and extends across from one box to the other.

7 indicates a bottom plate, mounted in the boxes 5—5ª and extending across from box to box.

8 (see Figs. 2 and 3) indicates a vertical plate, mounted in the center of the boxes 5—5ª and extending from box to box. The top plate 6, bottom plate 7 and vertical plate 8 are so arranged in the boxes as to divide them into two compartments, as is best shown in Fig. 3.

9 indicates an axle, which is of such cross section and size as to fit within one of the compartments of the boxes. The axle 9 carries upon its outer end one of the rear wheels, 10, of the scraper.

11 indicates a roller, which is journaled to the inner end of the axle 9 and is so mounted as to bear upon the upper surface of the lower plate 7.

12 indicates apertures in the upper surface of the axle 9.

13 indicates an axle of such section and size as to fit within the other compartment of the boxes 5—5ª. Both axles 9—13 are arranged so as to slide freely within the compartments of the boxes.

14 indicates a roller journaled on the inner end of the axle 13, and so mounted as to bear upon the upper surface of the lower plate 7.

15 indicates holes pierced in the upper side of the axle 13. The axle 13 carries upon its outer end the other rear wheel, 16, of the scraper.

17 indicates a box, open at the top, which is rigidly secured to the lower plate 7. The sides of the box 17 are so adjusted as to bear upon the outside surfaces of the axles 9—13, so as to form a guide. The box 17, instead of being a separate piece and rigidly secured to the lower plate 7, may, if desired, be formed integral therewith.

18 indicates a rack located in front of the axle 13 and secured to it at one end by a bolt 19. The rack 18 is provided at the other end with a clip 20 which embraces the axle 13 between the hub of the wheel 16 and the adjacent box 5ª.

21 indicates a vertical shaft which passes through the frame 1, and is journaled at its lower end to a suitable support 22 which is secured to the box 5ª in any appropriate manner.

23 indicates a wheel, which is mounted upon the upper end of the shaft 21.

24 indicates a cog-wheel, which is mounted upon the lower end of the shaft 21, the teeth of the cog-wheel 24 engaging with the teeth of the rack 18.

25 indicates rollers, which are journaled in the upper and outer corners of the boxes 5—5ª, and so mounted that they bear upon the upper surfaces of the axles 9—13.

26 indicates a foot-lever, which is pivoted to the rear side of the cross-bar 3.

27 indicates a foot-rest, which is secured to one end of the foot-lever 26.

28 indicates a rod, pivoted at its upper end to the end of the foot-lever 26 opposite the end carrying the foot-rest 27, and carrying upon its lower end a pin 29.

30 indicates a bracket, which is secured to the top plate 6, and is provided at its top with a suitable opening, through which the pin 29 passes.

31 indicates a spring, which is carried between the under surface of the bracket 30 and a cross pin 32 in the pin 29. The lower end of the pin 29 is of such shape as to fit within the holes 12 of the axle 9.

33 indicates a foot-lever pivoted to the front side of the cross-bar 2, and having a foot-rest 34 mounted upon one end. Upon the opposite end of the foot-lever 33 is pivoted a rod 35.

36 indicates a pin, which is mounted upon the lower end of the rod 35.

37 indicates a bracket, which is secured to the top plate 6, and is provided with a suitable opening at its top through which the pin 36 passes.

38 indicates a spring, which is supported between the under surface of the top portion of the bracket 37 and a cross pin 39 in the pin 36. The lower end of the pin 36 is adapted to fit into the holes 15 in the axle 13.

The operation of my device is as follows: When it is desired to spread the rear wheels of the scraper, the scraper-blade is lowered in the usual manner, thus raising the rear portion of the scraper frame, and the rear wheels with it, from the ground. The foot-rest 34 of the foot-lever 33 is then depressed, thus raising the other end of the foot-lever and withdrawing the pin 36 from the hole 15 in the axle 13. The wheel 23 is thereupon rotated, and by the action of the cog-wheel 24 upon the rack 18 the rack is moved, carrying with it the axle 13 and the rear wheel 16, to the position indicated by the dotted lines in Figs. 1 and 2. The rollers 14—25 and the guide box 17 serve to hold the parts in their proper position. When the wheels have been spread apart to the desired adjustment, the pressure on the foot-rest 34 is relaxed and the spring 38 then forces the pin 36 again into one of the holes 15, thus locking the axles in the desired position. When it is desired to adjust the frame of the scraper to a position centrally between the wheels as thus spread apart, the blade of the scraper is raised in the usual manner, thus lowering the rear part of the frame and with it the rear wheels 10—16 until they rest upon the ground. The foot-rests 27 and 34 are depressed, thereby raising the pins 29 and 36 out of engagement with the axles. The foot-rests are kept depressed and the wheel 23 is rotated in a direction opposite that in which it was rotated when the wheels were spread; and as the wheels 10—16 rest upon the ground and are thus incapable of moving, the action of the cog-wheel 24 upon the rack 18 will move the entire frame of the scraper to one side to the desired position, the rollers 25 bearing upon the upper surface of the axles 9—13. When the frame is adjusted to the desired position, the pressure on the foot-rests 27 and 34 are released and the springs 34 and 38 force the pins 29 and 36 back into engagement with the axles.

It is obvious that the top plate 6 must also be provided with suitable openings through which the pins 29—36 may pass. These are indicated in Fig. 1 of the drawings, but not shown in detail.

That which I claim as my invention, and desire to secure by Letters Patent, is—

1. The combination of a frame having an extensible axle composed of two separate axles, one of which is adapted to be laterally extended, means for extending the laterally extensible axle, spring-pressed locking pins mounted upon the said frame and automatically moved by their springs into engagement with the two axles, and means for moving the locking pins against the tension of their springs to disengage said pins from the axles, substantially as described.

2. The combination of a frame having an extensible axle composed of two separate axles, one of which is adapted to be laterally extended, means for extending the laterally extensible axle, locking pins mounted upon said frame and movable into and out of engagement with the axles, and lever mechanisms connected with the locking pins for withdrawing them from engagement with the axles, substantially as described.

3. The combination of a frame having an extensible axle composed of two separate axles, one of which is adapted to be laterally extended, rack and pinion mechanism for extending the laterally extensible axle, locking pins mounted upon the said frame and movable into and out of engagement with the two axles, and independent lever mechanisms connected respectively with the locking pins for withdrawing them from engagement with the two axles, substantially as described.

4. The combination with a frame, axle boxes secured thereto, two separate longitudinally movable axles slidingly mounted in said axle boxes, and wheels mounted on said axles, of a rack secured to one of said axles, a pinion engaging said rack, means for rotating the pinion, locking pins mounted upon the said frame and movable into and out of engagement with the two axles, and independent lever mechanisms connected respectively with said locking pins for withdrawing them from engagement with the axles, substantially as described.

5. The combination with a frame, axle boxes secured thereto, two separate longitudinally movable axles slidingly mounted in said axle boxes, a bearing plate secured to said axle boxes below said axles and connecting said axle boxes together, rollers journaled on the inner ends of said axles and bearing upon said bearing plate, rollers journaled in said axle boxes and bearing on said axles, and wheels mounted one on each of said axles, of a rack secured to one of said axles, a pinion engaging with said rack, mechanism for rotating said pinion whereby said rack may be moved longitudinally, and mechanism for locking said axles in the desired position, substantially as specified.

6. In a scraper, the combination with a frame 1, axle boxes 5—5ª secured to said frame, bearing-plates 6—7 secured to said axle boxes, axle 9 slidingly mounted in said axle boxes 5—5ª, and a wheel 10 mounted on said axle 9, of an axle 13 slidingly mounted in said axle boxes 5—5ª, a wheel 16 carried by said axle 13, a rack 18 secured to said axle 13, a pinion 24 mounted on said axle box 5ª and engaging with said rack, and mechanism for rotating said pinion so as to move said rack longitudinally, substantially as specified.

THOMAS R. McKNIGHT.

Witnesses:
    CHAS. C. PECK,
    C. B. RUKGABER.